Oct. 20, 1953

L. BOBROFF 2,656,216

ADJUSTABLE ROOF STRUCTURE FOR LOAD-CARRYING VEHICLES

Filed May 27, 1949

INVENTOR.
Louis Bobroff
BY
Attorney

Oct. 20, 1953     L. BOBROFF     2,656,216
ADJUSTABLE ROOF STRUCTURE FOR LOAD-CARRYING VEHICLES
Filed May 27, 1949     2 Sheets-Sheet 2
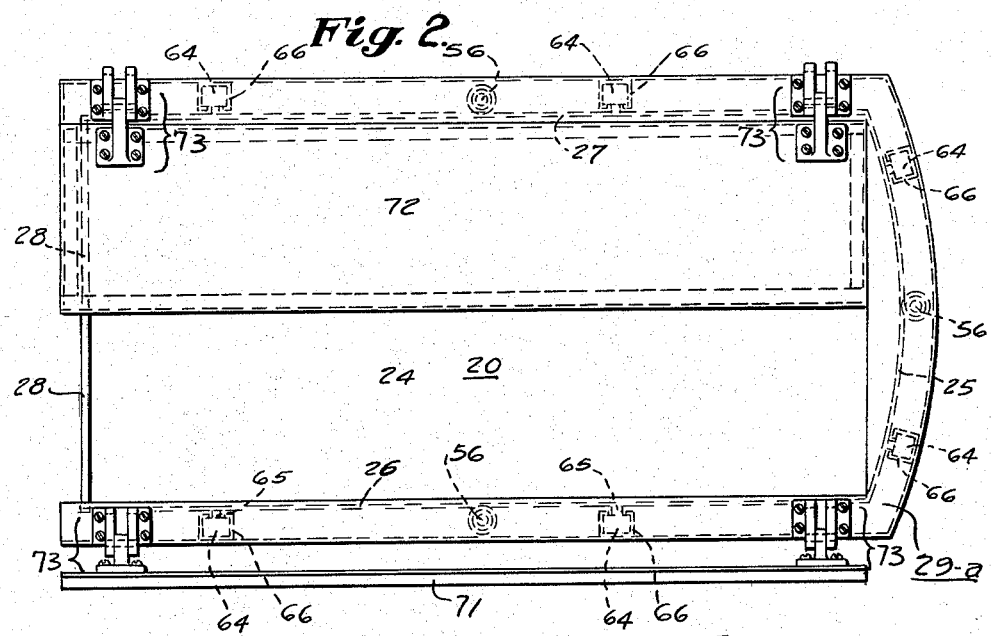
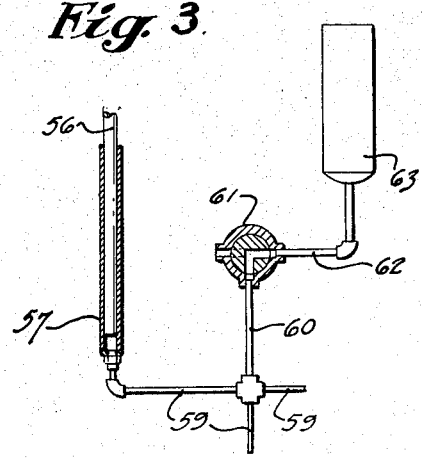
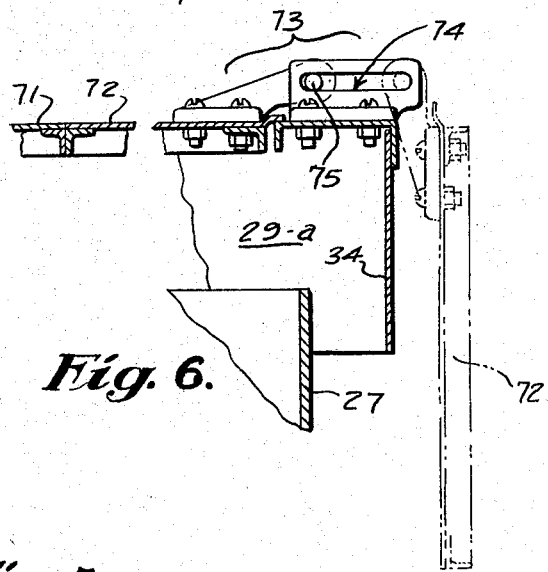
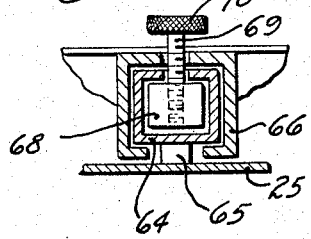
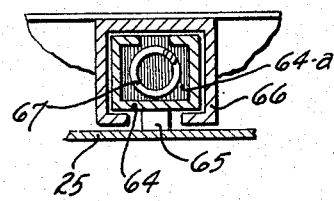
INVENTOR.
Louis Bobroff
BY
Attorney Patented Oct. 20, 1953

2,656,216

UNITED STATES PATENT OFFICE 2,656,216

ADJUSTABLE ROOF STRUCTURE FOR LOAD-CARRYING VEHICLES

Louis Bobroff, Philadelphia, Pa.

Application May 27, 1949, Serial No. 95,601

2 Claims. (Cl. 296—137)

The present invention relates generally to roof constructions for trucks, trailers, freight cars and the like and it relates more particularly to a new and improved roof construction wherein the roof can be quickly and easily raised and lowered relative to the sides of the body.

An object of the present invention is to provide a new and improved roof construction for trucks, trailers, freight cars and the like. Another object of the present invention is to provide a roof construction which can be quickly and easily raised or lowered relative to the sides of the body so as to provide increased capacity and ease of loading and unloading when necessary and so as to permit running with minimum overall height when empty or under reduced load whereby the vehicle can pass under low-clearance bridges or the like which would otherwise require a detour. Still another object of the present invention is to provide an adjustable roof construction for trucks, trailers, freight cars or the like which is simple and inexpensive and which can be quickly and easily manipulated to vary the vertical dimension of the vehicle, or to provide an open-top vehicle.

Other objects and advantages of the present invention are apparent in the following detailed description, appended claims and accompanying drawings.

Among the principal problems of the transportation industry are efficient utilization of the maximum space of the carrier and ease in loading and unloading. Thus in loading trucks, trailers, freight cars and the like with relatively large and bulky articles, as for example furniture, considerable space is frequently lost due to the fact that insufficient space remains at the top to hold another layer of articles. By way of illustration, if a truck-trailer body having an inside height of seven feet were loaded with desks each standing three feet, it is obvious that only two layers of desks could be put in and that the top foot of space would be wasted. Obviously, if the roof could be raised an additional two feet to accommodate a third layer of desks, the capacity of the vehicle would be correspondingly increased so as to provide more efficient and less expensive transportation.

However, if the third layer of desks were loaded through the usual back door of the truck-trailer with the roof at a nine-foot height, the lack of head-room would make loading more difficult and time-consuming because the men could not work in a comfortable position. Thus, if the roof of the vehicle could be raised even beyond the nine-foot limit, during loading, the loading efficiency would be still further increased.

Accordingly, the present invention contemplates a new and improved roof construction which can be used on freight cars and trucks and the like, but which is particularly well adapted for use on large truck-trailers or semi-trailers, which will enable the roof to be raised to a considerable extent during loading and thereafter lowered so as just to accommodate the height of the load (thereby to minimize overall height during running) and thereafter again to be raised during unloading and once more to be lowered when returning under reduced load or empty (to permit the empty or partly loaded vehicle to take the most direct route by utilizing underpasses, tunnels, and the like which would not accommodate the vehicle with the roof raised).

Generally speaking, the present invention contemplates a roof construction for truck-trailers or the like wherein the roof is constructed as a separate and distinct unit from the sides of the body and is mounted on a plurality of rods or posts which are synchronously operated by mechanical or hydraulic or pneumatic means to enable the roof to be quickly and easily raised and lowered during loading and unloading as mentioned above. The present invention further contemplates a roof construction wherein the roof unit, in addition to being vertically adjustable relative to the sides of the body, is provided with hinged or otherwise suitably mounted panels which can be thrown back to give an open-top construction where desired.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 2 represents a top-plan view of the embodiment of Figure 1 with one of the roof panels being shown in closed position and the other being shown in open position.

Figure 3 represents a more or less schematic view showing the pneumatic cylinders and air valve of Figure 1; parts being broken away better to reveal the construction thereof.

Figure 4 represents a horizontal cross-sectional view generally along the line 4—4 of Figure 1.

Figure 5 represents a horizontal cross-sectional view generally along the line 5—5 of Figure 1.

Figure 6 represents a fragmentary vertical cross-sectional view generally along the line 6—6 of Figure 1; the top door being shown in closed position in solid lines and in open position in dash-dot lines.

Figure 1:
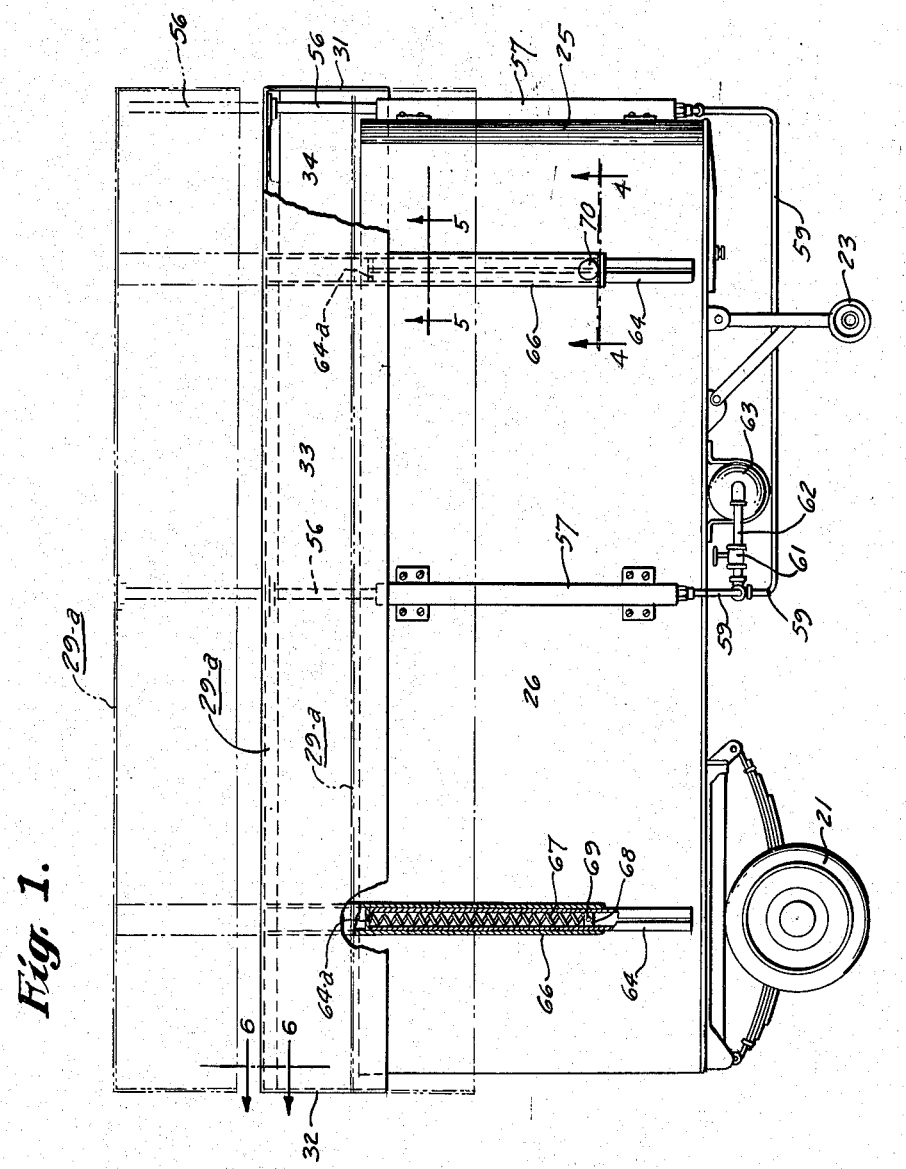
Figure 1 represents a side elevational view of one embodiment of the present invention employing a pneumatic raising and lowering mechanism.

According to the embodiment of the present invention shown generally in Figure 1, the roof unit 29-a is constructed and arranged to be raised by pneumatic means, preferably employing compressed air from the tank or reservoir forming part of the air-brake system.

Thus, the roof unit 29-a may be supported by a plurality (for example one or more on each side and one in the front) of piston-rods 56 whose lower ends extend downward within vertically-disposed cylinders 57 mounted on the walls 25—7 by brackets 58.

As shown particularly in Figure 3, the cylinders 57 may be of conventional construction, open at the top and having air inlet lines 59 communicating with their bottom ends. The three lines 59 connect with a single line 60 leading to a two-way valve 61 which can be adjusted to the position shown in solid lines in Figure 3 so that it connects the line 60 with another line 62 leading to the compressed-air tank 63, thereby to admit air to the cylinders 57 and to raise the several piston-rods 56 synchronously from the lowermost position shown in dash-dot lines in Figure 1 to an intermediate position as shown in solid lines in Figure 1 and, ultimately, to the uppermost position, also shown in dash-dot lines in Figure 1.

When the valve 61 is turned 90° to the position shown in dash-dot lines in Figure 3, the line 62 is closed off and the line 60 is vented to the atmosphere so as to permit the escape of the compressed air previously introduced into the lower portions of the cylinders 57 and to permit the piston-rods 56 and the roof unit 29-a to descend.

In order to provide greater support and rigidity for the roof unit, the embodiment of Figure 1 is provided with a plurality (for example two on the front wall 25 and two on each of the side walls 26 and 27) of C-shaped panels 64 mounted in spaced relationship to the walls 25—27 by spacer-strips 65.

Somewhat larger and oppositely-directed C-shaped channels 66 have their upper ends fastened to the roof unit (inside the panels 31, 33 and 34) and are constructed and arranged to fit over the channel 64 in slidable relationship thereto as indicated particularly in Figure 5.

A compression spring 67 is disposed within each of the channels 64. The upper end of each channel 64 may be closed as at 64-a to provide an abutment for the upper end of the spring 67. The lower end of each spring 67 rests against a tongue-member 68 which is mounted at the lower end of each channel 66 and is constructed and arranged to extend within the inner channel 64 as indicated particularly in Figure 4.

It is apparent that, as the roof unit 29-a is raised by the piston-rods 56 (when air under pressure is admitted to the cylinders 57 as described above) the channels 66 move upward relative to the channels 64 so that the tongue-members serve to compress the springs 67.

The tongue-members 68 are provided with screw-threaded stems 69 constructed and arranged to lock the channels 66 and 64 together at any desired point by turning of the knurled knobs 70.

It is apparent that, with the roof unit in elevated position, venting of the valve 61 and loosening of the knobs 70 will cause the roof unit to be moved downward under the pressure of the springs 67 acting on the tongue-member 68.

When it is desired to load the trailer, the knobs 70 are loosened and the valves 61 turned to the solid line position of Figure 3 to admit air to the cylinders 57 and to raise the roof unit 29-a to the uppermost position. The knobs 70 are then tightened to maintain the roof in this uppermost position during loading; the valve 61 being then turned to the dash-dot line position of Figure 3 wherein the cylinders are vented and the line 62 leading to the compressed air tank 63 is closed off.

After the loading has been completed, the knobs 70 are loosened to permit the roof unit 29-a to move downward to the running position shown in solid lines in Figure 1, after which the knobs 70 are again tightened to lock the roof unit in this last-mentioned position.

When it is desired to unload the trailer at its destination, the valve 61 is turned to position sending compressed air into the cylinders 57, after which the knobs 70 are loosened and the roof unit 29-a moves upward under the upward pressure on the piston-rods 56 (which pressure, of course, is sufficiently great to exceed the downward pressure of the springs 67) until the roof unit again reaches its uppermost position shown in dash-dot lines in Figure 1, whereupon the knobs 70 are again tightened and the cylinders 57 vented.

When the unloading has been completed, the knobs 70 are once more loosened, whereupon the springs 67 force the roof unit 29-a downward either to some intermediate position or to the lowermost position shown in dash-dot lines in Figure 1 (when the trailer is to return empty or with a reduced load which will fit within its normal height).

Where the weight of the roof unit 29-a is sufficiently great to ensure positive downward movement under the action of gravity, the springs 67 may be omitted.

Instead of employing only a single piston-rod and cylinder on each of the side-walls 26 and 27, it is, of course, possible to employ any larger number (as for example three or more on each side). Of course, if a sufficient number of piston-rods are provided to ensure adequate and uniform support of the roof unit, the channels 64 and 66 may be eliminated. In such case, a collar having a threaded locking screw may be provided for each piston-rod 56 just above the upper end of the cylinder 57 so as to maintain the roof unit in elevated position when the cylinders are vented.

As mentioned hereinabove, it is possible to use other means for applying a differential pressure on the piston-rods within the cylinders in order to lift them.

Thus, for example, any hydraulic liquid (such as those conventionally used in hydraulic braking systems) may be employed with suitable pump, in place of the compressed air.

Where a vacuum-braking system is employed, the air lines described above may be replaced by suction lines leading to the vacuum tank of the braking system; the suction lines, of course, terminating at the opposite (namely upper) ends of the cylinders which would then have closed upper ends and open lower ends to permit atmospheric pressure to force the piston-rods upward within the cylinders.

Where any differential-pressure fluid system (whether compressed air, liquid or vacuum) is used, it is possible to employ a double-acting cylinder of conventional construction having valve means constructed and arranged to transmit the actuating pressure (or suction) to either end of the cylinder, optionally. Such conventional double-acting cylinder constructions (the mechanisms of which are well known in the art and are disclosed in various prior patents) would, of course, provide positive downward pressure as well as upward pressure, so as to eliminate the need for springs 67 described hereinabove.

While the roof unit 29-a of the embodiment of Figure 1 may be constructed with a single horizontal main panel, it may, alternatively, be formed in the manner shown particularly in Figures 2 and 6.

In this embodiment, the roof unit 29-a is provided with a pair of top doors 71 and 72 which are mounted on side hinges 73 so that the doors can be closed in the manner indicated in Figure 2 and also indicated in solid lines in Figure 6, or, instead, can be thrown open to hang downward in the manner indicated in dash-dot lines in Figure 6.

The hinges 73 are provided with relatively long horizontally extending slots 74 through which pass the pins 75 carried by the doors 71 and 72. The length of the slots 74 is sufficiently great that the doors 71 and 72 can be shifted laterally as well as pivoted, to enable them to clear the side panels of the roof unit 29-a and to hang straight down in open position.

This top door construction is particularly desirable where the trailer is to be used for carrying steel beams or other heavy structural elements or machinery which are normally loaded from the top by cranes or the like.

Instead of having the rack-and-pinion assembly or the piston-rod-and-cylinder assembly disposed outside the walls 25—7, it is possible to position them so that they are mounted on the inside of the walls, intermediate the outer walls and the plywood or sheet-metal lining which is customarily provided in trucks, trailers or the like. This inside mounting would have the advantage of protecting the lifting mechanism from the elements and, accordingly, may be preferred under some circumstances.

Where the vehicle does not have rear loading doors (as for example where one or more side doors are provided) the rear end of the vehicle can be made substantially identical in structure with the front end as described hereinabove. That is, in such case, the rear end can also be provided with a supporting tube 37, a toothed rod 36, a pinion 43 and a shaft 45 having end bevel gears 46 meshing with corresponding gears placed at the rear ends of the shafts 44 and 45; or, instead, the rear end may be provided with a piston-rod 56 and cylinder 57.

Instead of employing one-piece piston-rods 56 connected to the roof, the rods leading from the cylinder to the roof unit can be constructed in two portions; the upper end of the piston-extension-rod abutting the lower end of a separate rod extending down from the roof unit and separately slidably fastened to the adjoining wall of the truck.

It is apparent that the channels 64 and 66 can be constructed with round or other suitable cross-section, if desired.

It is also apparent that the smaller channel 64 could be replaced by any suitable headed or enlarged male element (as for example a skate-wheel) which would be fastened to the skirt and which would provide free sliding action within the outer channel 66.

It is obvious, of course, that the larger channel could be mounted on the skirt and the smaller channel on the side-wall without departing from the spirit of the present invention.

The present invention may be embodied in other specific forms without departing from the spirit or essential attributes thereof, and it is therefore desired that the present embodiments be considered in all respects as illustrative and not restictive, reference being had to the appended claims rather than to the foregoing description to indicate the scope of the invention.

Having thus described my invention, I claim as new and desire to protect by Letters Patent:

1. In a load-carrying vehicle having a floor and having generally upright side-walls and a front-wall immovably fastened together; a vertically adjustable roof-structure comprising a roof-unit having a generally horizontal form-retaining top-wall and having panels extending downwardly from the edges of said top-wall in over-lapping relationship to said side-walls and front-wall, a plurality of spaced generally vertical supporting rods having their upper ends fastened to said roof-unit inside said panels, piston-and-cylinder means mounted on said walls for synchronously raising and lowering said rods thereby to vary the height of said roof-unit, and means for maintaining said roof-unit in horizontally-fixed relationship to said walls, said last-mentioned means comprising interlocking generally C-shaped channel members carried by said walls and said panels to permit said panels to move vertically while restraining them from horizontal movement relative to said walls, said channel members having springs operatively mounted therewithin and constructed and arranged to exert downward pressure upon said roof-unit when said roof-unit is in elevated position.

2. In a merchandise-transporting vehicle, a floor, upwardly extending side walls rigidly secured to the floor, an upwardly extending end wall rigidly secured to the floor, said floor and upwardly extending walls comprising a lower portion, a roof member projecting beyond the upwardly extending walls, rigid end and side walls downwardly extending from the roof member and spaced outwardly from the upwardly extending walls, said roof and downwardly extending walls comprising a roof unit of a vertically telescopic merchandise-transporting vehicle, a plurality of vertically positioned C-shaped channel members secured to the upwardly extending walls, a plurality of C-shaped channel members secured vertically to the downwardly extending walls and slidably engaging the C-shaped members on the upwardly extending walls for vertical movement of the roof unit relative to the lower portion, said interengaging C-shaped members substantially preventing relative movement between the roof unit and lower portion other than said vertical movement, a plurality of springs each positioned within the inner of a pair of slidably engaging C-shaped members and hooked to the roof unit and lower portion to urge the roof unit downwardly, a plurality of piston-and-cylinder units secured to the exterior of a plurality of upwardly extending walls, a plurality of vertical rods having their upper ends secured to the roof unit interiorly of the downwardly extending walls and secured at their lower ends to the piston-and-cylinder units for relative vertical movement of said rods, means providing fluid pressure, means for applying said fluid pressure to said cylinder and piston units to raise the plurality of said rods synchronously, control means for applying and dissipating said fluid pressure and separate means for locking the roof unit at its uppermost, lowermost or intermediate positions.

LOUIS BOBROFF.

References Cited in the file of this patent

UNITED STATES PATENTS

| Number | Name | Date |
|---|---|---|
| 335,718 | Price | Feb. 9, 1886 |
| 1,926,757 | Tendero | Sept. 12, 1933 |
| 2,168,069 | Miller | Aug. 1, 1939 |
| 2,193,352 | Thomas | Mar. 12, 1940 |
| 2,344,551 | Heinrich | Mar. 21, 1944 |
| 2,551,239 | Bond | May 1, 1951 |

FOREIGN PATENTS

| Number | Country | Date |
|---|---|---|
| 13,977 | Great Britain | 1884 |
| 271,388 | Great Britain | May 26, 1927 |
| 329,088 | Great Britain | May 15, 1930 |
| 74,760 | Germany | Apr. 24, 1894 |
| 811,585 | France | Apr. 17, 1937 |
| 106,933 | Australia | Mar. 14, 1939 |